(12) United States Patent
Kim et al.

(10) Patent No.: US 9,897,827 B1
(45) Date of Patent: Feb. 20, 2018

(54) FEEDBACK CONTROLLED CLOSED LOOP ON-CHIP ISOLATOR

(71) Applicant: Intel Corporation, Santa Clara, CA (US)

(72) Inventors: Woosung Kim, Mountain View, CA (US); Haisheng Rong, Pleasanton, CA (US); John Heck, Berkeley, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/221,436

(22) Filed: Jul. 27, 2016

(51) Int. Cl.
| G02B 6/27 | (2006.01) |
| G02F 1/095 | (2006.01) |
| G02F 1/09 | (2006.01) |

(52) U.S. Cl.
CPC ......... *G02F 1/0955* (2013.01); *G02B 6/2746* (2013.01); *G02F 1/092* (2013.01)

(58) Field of Classification Search
CPC .................................. G02B 6/27; G02B 6/274
USPC ....................................................... 385/11, 14
See application file for complete search history.

(56) References Cited

U.S. PATENT DOCUMENTS

| 7,916,982 B1 | 3/2011 | Bahuguna et al. |
| 9,274,279 B1 | 3/2016 | Roth et al. |
| 2005/0169582 A1* | 8/2005 | Tan ..................... G02B 6/12007 385/50 |
| 2005/0196103 A1 | 9/2005 | Kaplan |
| 2006/0103380 A1* | 5/2006 | Kochergin ......... G01R 33/0322 324/244.1 |
| 2006/0214866 A1* | 9/2006 | Araki ..................... G04G 21/04 343/788 |
| 2006/0227331 A1* | 10/2006 | Vollmer ................. G01N 21/23 356/483 |

(Continued)

FOREIGN PATENT DOCUMENTS

| JP | H11246296 A | 9/1999 |
| WO | WO2012125368 A1 | 9/2012 |

OTHER PUBLICATIONS

Shintaku et al., "Preparation of Ce-Substituted Yttrium Iron Garnet Films for Magneto-Optic Waveguide Devices", Japanese Journal of Applied Physics, vol. 35, Jul. 3, 1996, pp. 4689-4691.

(Continued)

*Primary Examiner* — Kaveh C Kianni
(74) *Attorney, Agent, or Firm* — Schwabe, Williamson & Wyatt, P.C.

(57) ABSTRACT

Embodiments herein relate to a photonic integrated circuit (PIC) with an on-chip optical isolator. The PIC may comprise a laser, a waveguide coupled with the laser, and a closed loop resonator coupled to the laser through the waveguide. A magneto-optical (MO) layer is over and in contact with the waveguide and the closed loop resonator. The closed loop resonator may comprise a first polarization rotator (PR) and a second PR. A light from the laser in transverse electric (TE) mode through the waveguide is rotated in the first PR to a light in transverse magnetic (TM) mode, and the light in TM mode is rotated in the second PR to light in TE mode. The isolator may further comprise a micro-heater over or along a side of the waveguide and separated from the closed loop resonator; and a feedback control loop connected to the closed loop resonator and the micro-heater.

9 Claims, 8 Drawing Sheets

(56) References Cited

U.S. PATENT DOCUMENTS

| | | | | |
|---|---|---|---|---|
| 2008/0267557 | A1* | 10/2008 | Wang | B82Y 20/00 385/16 |
| 2009/0136191 | A1 | 5/2009 | Bi et al. | |
| 2009/0142019 | A1* | 6/2009 | Popovic | B82Y 20/00 385/28 |
| 2010/0158430 | A1 | 6/2010 | Nakada et al. | |
| 2010/0238536 | A1* | 9/2010 | Hu | G02B 6/12007 359/280 |
| 2012/0002914 | A1* | 1/2012 | Kroemer | G02F 1/0955 385/14 |
| 2012/0189246 | A1 | 7/2012 | Hofrichter et al. | |
| 2013/0251299 | A1 | 9/2013 | He et al. | |
| 2014/0270629 | A1 | 9/2014 | Dutt et al. | |
| 2014/0334764 | A1 | 11/2014 | Galland et al. | |
| 2015/0097210 | A1 | 4/2015 | Krasulick et al. | |
| 2015/0219935 | A1 | 8/2015 | Guzzon et al. | |
| 2015/0261058 | A1* | 9/2015 | Silverstone | G02F 1/395 385/3 |
| 2016/0049767 | A1 | 2/2016 | Morton et al. | |
| 2017/0199402 | A1* | 7/2017 | Sun | G02F 1/0955 385/14 |

OTHER PUBLICATIONS

Shoji et al., "Silicon Mach-Zehnder interferometer optical isolator having 8 nm bandwidth for over 20 dB isolation", Japanese Journal of Applied Physics, vol. 53, Jan. 24, 2014, 4 pages.

Ghosh, Samir, "Optical isolators in silicon based photonic integrated circuits", PhD Thesis, Ghent University, (2013), 203 pages.

Ghosh et al., "Ce:YIG/Silicon-on-Insulator waveguide optical isolator realized by adhesive bonding", Optics Express, vol. 20, No. 2, Jan. 16, 2012, pp. 1839-1848.

Reed et al., "Silicon optical modulators." Nature Photonics, vol. 4, Aug. 2010, pp. 518-526.

Heck et al., "Integrated Microwave Photonic Isolators: Theory, Experimental Realization and Application in a Unidirectional Ring Mode-Locked Laser Diode," Photonics, vol. 2, (2015), pp. 957-968.

Ghosh et al., "Compact Mach-Zehnder Interferometer Ce: YIG/SOI Optical Isolators." Photonics Technology Letters, vol. 24, No. 18, Sep. 15, 2012, pp. 1653-1656.

Gardes et al., "40 Gb/s silicon photonics modulator for TE and TM polarisations," Optics Express, vol. 19, No. 12, Jun. 6, 2011, pp. 11804-11814.

Cardenas et al., "Low loss etchless silicon photonic waveguides," Optics Express, vol. 17, No. 6, Mar. 16, 2009, pp. 4752-4757.

Dai et al., "Polarization management for silicon photonic integrated circuits," Laser Photonics Rev., (2013), 26 pages.

Galland et al. "Broadband on-chip optical non-reciprocity using phase modulators." Optics Express, vol. 21, No. 12, Jun. 17, 2013, pp. 14500-14511.

Tzuang et al "Non-reciprocal phase shift induced by an effective magnetic flux for light." Nature Photonics, Jun. 23, 2014, 11 pages.

Non-Final Office Action dated Mar. 24, 2017 for U.S. Appl. No. 15/071,105, 22 pages.

Stadler et al., "Integrated Magneto-Optical Materials and Isolators: A Review"; IEEE Photonics Journal, vol. 6, No. 1, Feb. 2014, 16 pages.

International Search Report and Written Opinion dated Apr. 20, 2017 for International Application No. PCT/U2017/016733, 12 pages.

Shoji et al., "Optical nonreciprocal devices based on magneto-optical phase shift in silicon photonics," Journal of Optics 181, (2015), 15 pages.

Bi et al., "On-chip optical isolation in monolithically integrated non-reciprocal optical resonators," Nature Photonics, vol. 5, Dec. 2011, pp. 758-762.

Agarwal et al., "Wavelength Locking of a Si Photonic Ring Transmitter using a Dithering-based OMA Stabilizing Feedback Loop," Optical Society of America, (2016), 3 pages.

Sun et al., "A Monolithically-Integrated Chip-to-Chip Optical Link in Bulk CMOS," IEEE Journal of Solid-State Circuits, vol. 50, No. 4, Apr. 2015, pp. 828-844.

Dai et al., "Passive technologies for future large-scale photonic integrated circuits on silicon: polarization handling, light non-reciprocity and loss reduction," Light: Science & Applications, (2012), 12 pages.

Hendry et al., "Time-division-multiplexed arbitration in silicon nanophotonic networks-on-chip for high-performance chip multiprocessors," J. Parallel Distrib. Comput. 71(5), (2011), pp. 641-650.

Tien et al., "Silicon ring isolators with bonded nonreciprocal magneto-optic garnets," Optics Express, vol. 19, No. 12, Jun. 6, 2011, pp. 11740-11745.

Heck et al., "On-Chip Optical Isolator", U.S. Appl. No. 15/071,105, filed Mar. 15, 2016, 35 pages.

International Search Report and Written Opinion dated Aug. 25, 2017 for International Application No. PCT/US2017/039303, 11 pages.

Final Office Action dated Oct. 19, 2017 for U.S. Appl. No. 15/071,105, 21 pages.

International Search Report and Written Opinion dated Nov. 8, 2017 for International Application No. PCT/US2017/044386, 13 pages.

\* cited by examiner

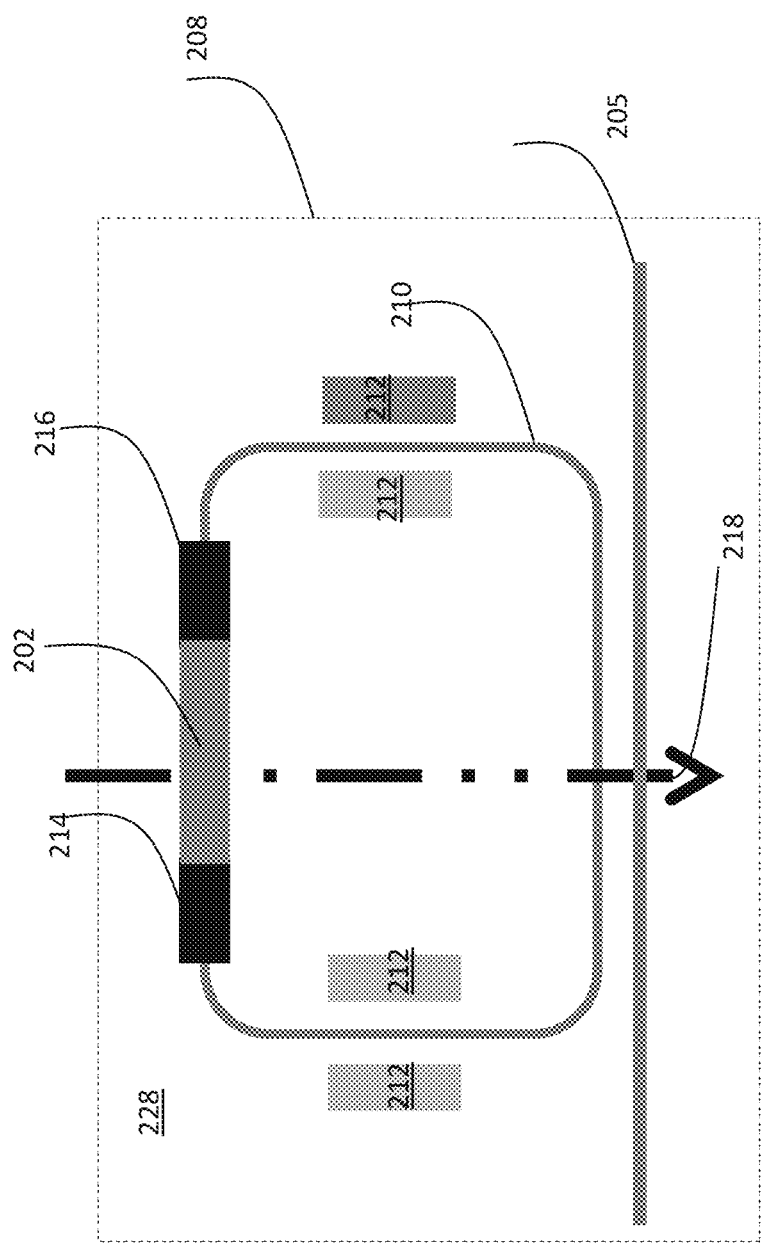

FEEDBACK CONTROLLED CLOSED LOOP ON-CHIP ISOLATOR

FIELD

Embodiments of the present disclosure generally relate to the field of optoelectronics and, more particularly, to photonic integrated circuits with on-chip optical isolators.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Photonic integrated circuits may be considered a promising candidate for next generation interconnects for data center and high performance computing. Optical waveguide-based photonics integrated circuits such as lasers, modulators, and detectors may be typically fabricated on silicon-on-insulator (SOI) wafers. At a high data rate, e.g., larger than 10 Gb/s, a minor laser instability may cause burst bit errors and may disrupt the operations on a link of the interconnects significantly. Laser instability may be caused by feedback or reflections to the laser.

An optical isolator may be used for protecting photonics integrated circuits from reflections because an optical isolator may allow light waves to propagate in specified directions while preventing the propagation of light waves in undesired directions. However, a traditional optical isolator may be a standalone device, which may be bulky, expensive, and complicated to integrate. In addition, many existing on-chip optical isolators may have high insertion loss and complicated manufacturing processes. High insertion loss may be a challenging barrier to the commercialization of on-chip optical isolators, while complicated manufacturing processes for on-chip optical isolators may be costly and hard to manage.

BRIEF DESCRIPTION OF THE DRAWINGS

Embodiments of the photonic integrated circuits with on-chip optical isolator techniques of the present disclosure may overcome these limitations with reduced insertion loss and easier manufacturing process. The techniques will be readily understood by the following detailed description in conjunction with the accompanying drawings. To facilitate this description, like reference numerals designate like structural elements. Embodiments are illustrated by way of example, and not by way of limitation, in the figures of the accompanying drawings.

FIG. 1A schematically illustrates a block diagram of an optoelectronic system incorporated with a photonic integrated circuit having an on-chip optical isolator, while

FIGS. 2A-2C schematically illustrate cross-sectional side views of a photonic integrated circuit having an on-chip optical isolator and a top view of the on-chip optical isolator, according to various embodiments.

DETAILED DESCRIPTION

Figure 1A:
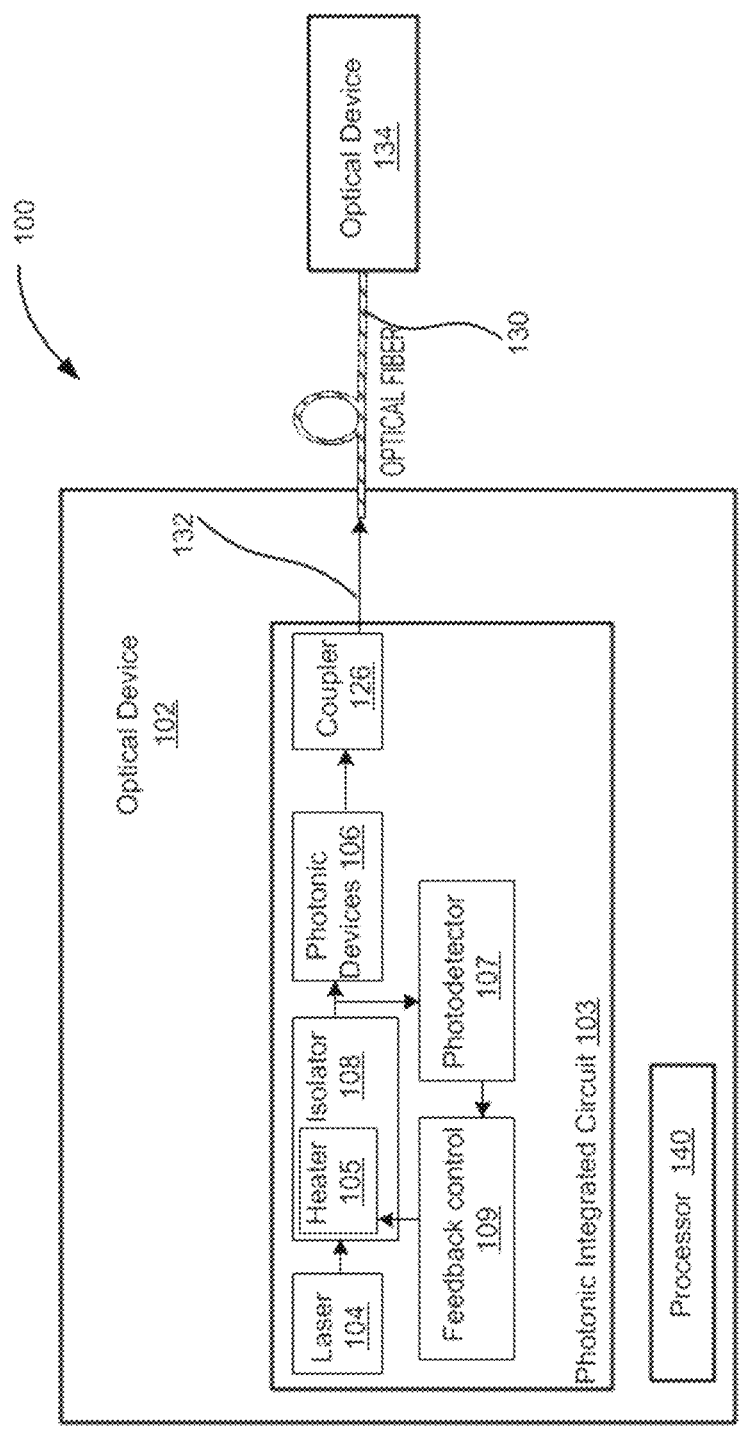

In silicon photonics, a laser may be integrated into a photonic integrated circuit (PIC) containing a variety of other components (modulators, splitters, couplers, filters, detectors) on-chip. It may be desirable for a laser to be robust against feedback or reflections. Typically, reflections may be suppressed using an optical isolator, which may allow light propagations in the forward direction while substantially attenuating light propagations in the reverse direction. However, an off-chip optical isolator may be bulky, expensive, and complicated to integrate. In addition, if an off-chip optical isolator is used, the laser may still be subject to reflections from the on-chip components, including any output coupler. In some situations, it may be preferable to use an on-chip optical isolator directly downstream from the laser to reduce or eliminate reflections from on and off chip. However, many existing on-chip optical isolators may have high insertion loss and complicated manufacturing processes. In embodiments, an optical isolator may be simply referred to as an isolator.

Optical isolators may be integrated on-chip using a magneto-optical effect generated by a magnetized magneto-optic (Mo) material situated adjacent to a waveguide. A few different mechanisms may be used to integrate optical isolators through magneto-optical effects, such as non-reciprocal Transverse Electric (TE)-Transverse Magnetic (TM) (TE-TM) mode conversion, non-reciprocal loss (NRL), and non-reciprocal phase shift (NRPS). Optical isolators may use MO material to generate a NRPS effect with the existence of an external unidirectional magnetic field.

The NRPS type devices may use a Mach-Zehnder interferometer (MZI) isolator or a ring resonator for obtaining nonreciprocal optical transmittance. A MZI isolator may be in a size on the order of millimeters, which may make the integration of the MZI isolator difficult and expensive, while a ring resonator may be much smaller, on the order of 10 microns to 100 nanometers. On the other hand, a MZI isolator may enable a wide bandwidth operation, while a ring resonator may have a narrow bandwidth operation. For an NRPS type isolator, a light in TM mode may enter a MO material. However, the light in TM mode interfacing directly with a MO material may lead to high insertion loss.

In addition, optical isolators may have complicated manufacturing processes. Optical isolators may be integrated with the MO material by sophisticated epitaxial deposition techniques or direct bonding. Using the epitaxial deposition techniques, a crystalline MO layer may grow directly on a silicon wafer. However, the growing process may use high temperatures and buffer layers, and may still result in a sub-optimal film quality. For example, the thickness of the MO layer may be critical in the epitaxial deposition process. If the MO layer is thicker than a certain thickness, cracks may be created due to thermal mismatch between the MO layer and a silicon substrate. In addition, a buffer layer for the MO layer deposition may degrade optical field intensity in the MO layer. On the other hand, the direct bonding of MO material may require a strong gradient in the magnetostatic field.

Embodiments of the photonic integrated circuits with on-chip optical isolator techniques of the present disclosure may overcome these limitations with reduced insertion loss and easier manufacturing process. Embodiments of the present disclosure relate to PIC having an on-chip optical isolator to reduce reflections to a laser by suppressing reflections on a photonics device such as a silicon photonics transmitter chip.

In various embodiments, the on-chip optical isolator may include a MO layer over a closed loop resonator, which is much smaller than a MZI isolator. In more details, the closed loop resonator may include a first polarization rotator (PR) and a second PR. A light from a laser in TE mode through a waveguide may be rotated in the first PR to a light in TM mode. Afterwards, the light in TM mode is rotated in the second PR back to the light in TE mode. Furthermore, the closed loop resonator may be completely under the MO layer. The light from the laser may enter the MO layer in TE mode, be rotated to the light in TM mode by the first PR, and be further rotated back to the light in TE mode by the second PR, before leaving the MO layer in TE mode. In operation, a magnetic field may be perpendicular to the light in TM mode in one direction. As a result, the light enters the MO layer in TE mode and rotated to TM mode by the first PR within the MO material. In this way, insertion loss caused by the light entering the MO material in TM mode may be reduced. Furthermore, the embodiments may further include a micro-heater over the waveguide or by a side of the waveguide, and separated from the closed loop resonator, and a feedback control loop connected to the closed loop resonator and the micro-heater. The inclusion of the micro-heater and the feedback control loop may enable a wide bandwidth operation for the closed loop resonator.

The inclusion of the pair of PRs on a closed-loop resonator may make the manufacturing process for on-chip optical isolator easier, because a magnetostatic field on the TM mode light section between two PRs may be made unidirectional in an easier way. Embodiments of the present disclosure may relate to fabricating a PIC having an on-chip optical isolator. In an example embodiment, the technique may include: forming a wafer that includes a laser in a first section, a waveguide coupled to the laser, a closed loop resonator coupled to the laser through the waveguide within a second section disjoint from the first section, wherein the closed loop resonator includes a first polarization rotator (PR), and a second PR, and wherein a light from the laser in transverse electric (TE) mode through the waveguide is rotated in the first PR to a light in transverse magnetic (TM) mode, and the light in TM mode is rotated in the second PR back to the light in TE mode; forming a first cladding layer over the laser, the waveguide; and the closed loop resonator; removing the first cladding layer in the second section to expose the waveguide and the closed loop resonator; and forming a MO layer within the second section over and in direct contact with the waveguide and the closed loop resonator. In operation, a magnetic field may be applied perpendicular to the light in TM mode in one direction interact with the MO layer to generate a NRPS effect for the optical isolator.

In the following description, various aspects of the illustrative implementations will be described using terms commonly employed by those skilled in the art to convey the substance of their work to others skilled in the art. However, it will be apparent to those skilled in the art that embodiments of the present disclosure may be practiced with only some of the described aspects. For purposes of explanation, specific numbers, materials, and configurations are set forth in order to provide a thorough understanding of the illustrative implementations. It will be apparent to one skilled in the art that embodiments of the present disclosure may be practiced without the specific details. In other instances, well-known features are omitted or simplified in order not to obscure the illustrative implementations.

In the following detailed description, reference is made to the accompanying drawings that form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Operations of various methods may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiments. Various additional operations may be performed and/or described operations may be omitted, split or combined in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

The description may use perspective-based descriptions such as top/bottom, in/out, over/under, and the like. Such descriptions are merely used to facilitate the discussion and are not intended to restrict the application of embodiments described herein to any particular orientation.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or more elements are in direct contact.

As used herein, the term "module" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable components that provide the described functionality.

Various embodiments may include any suitable combination of the above-described embodiments including alternative (or) embodiments of embodiments that are described in conjunctive form (and) above (e.g., the "and" may be "and/or"). Furthermore, some embodiments may include one or more articles of manufacture (e.g., non-transitory computer-readable media) having instructions, stored thereon, that when executed result in actions of any of the above-described embodiments. Moreover, some embodiments may include apparatuses or systems having any suitable means for carrying out the various operations of the above-described embodiments.

Figure 1B:
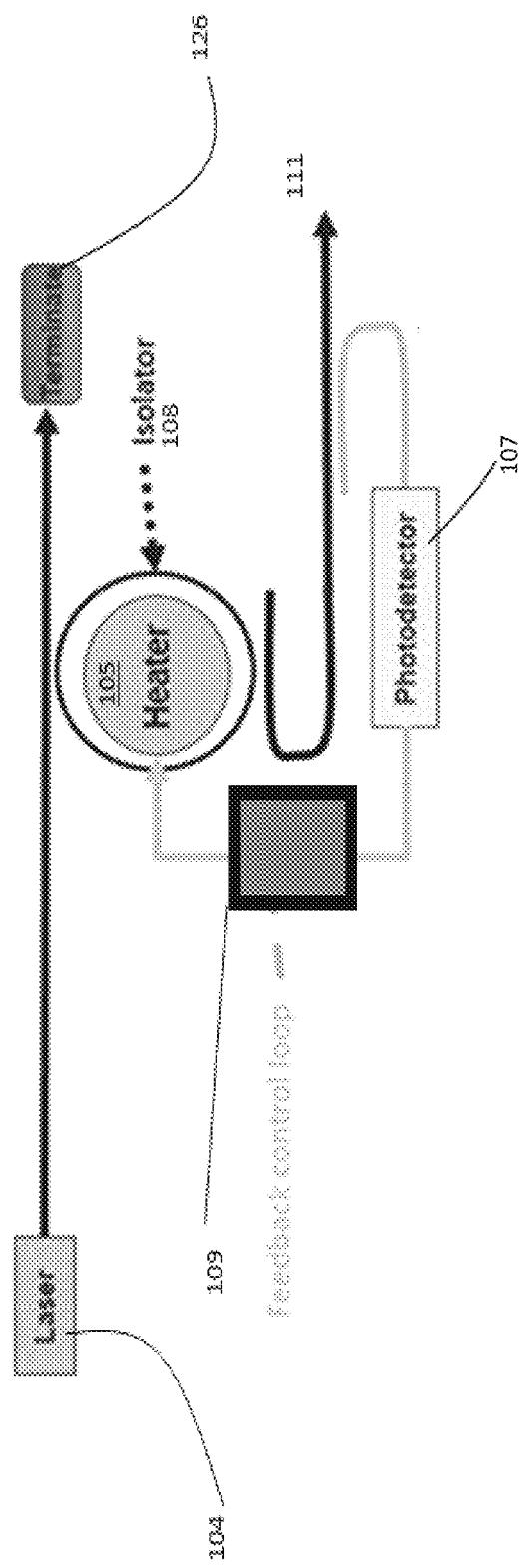
FIGS. 1B-1C show more details of the operation for the optical isolator, according to various embodiments.
Figure 1C:
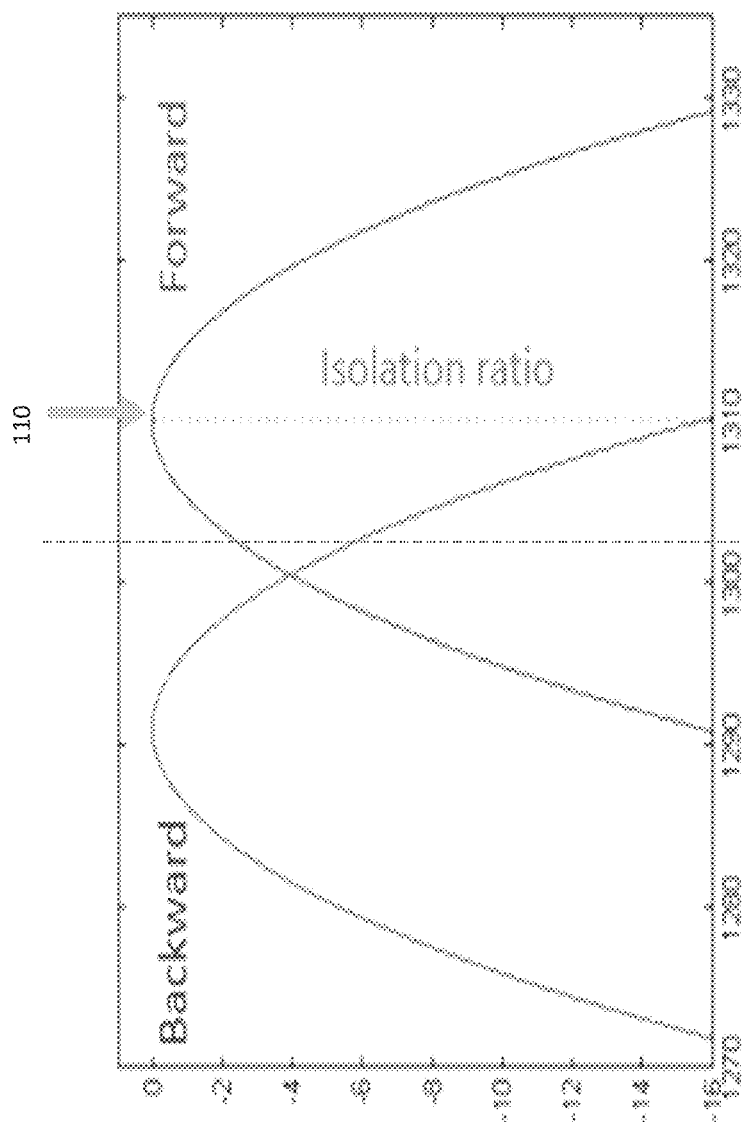

FIG. 1A schematically illustrates a block diagram of an optoelectronic system 100 incorporated with a PIC 103 having an on-chip optical isolator 108, while FIGS. 1B-1C show more details of the operation of the isolator 108, according to various embodiments. The optoelectronic system 100 shown in FIG. 1A may be used to transmit an optical signal modulated with a data signal via an optical fiber, for example, between racks in a data center, or long-distance, between data storage facilities, data centers, and the like.

The optoelectronic system 100 may include an optical apparatus (device) 102 having one or more PICs 103 with one or more on-chip light sources (e.g., laser) 104 to provide a light signal (e.g., constant light intensity signal) to one or more photonic devices 106 on the PIC 103 such as a modulator to modulate input light according to a data signal to be transmitted.

In various embodiments, the light source 104 may be a hybrid laser that emits light at a wavelength of approximately 1310 nanometers (nm). In some embodiments, the light source 104 may emit light at a different wavelength such as 1550 nm, for example. An optical coupler 126 may be a component of or coupled with the PIC 103.

The optical coupler 126 may provide an interface to an optical communication channel (e.g., optical fiber cable or other configuration that may include coupling optics followed by fiber) 130 and may be to transfer an optical signal 132 to the optical communication channel 130 to be received by another optical device 134.

In various embodiments, the optical apparatus 102 may include a processor 140 that may be coupled with one or more components of the PIC 103. In some embodiments, the processor 140 may be coupled with a modulator included in the photonic devices 106. In embodiments, the modulator may modulate a light signal from the light source 104 for transmission over the optical communication channel 130 based at least in part on a signal from the processor 140. In some embodiments, the processor 140 may include one or more modules to generate control signals for the light source 104 and/or one or more of the photonic components included in the photonic devices 106. The photonic devices 106 may include photonic components such as modulators, splitters, couplers, filters, detectors, phase shifters, polarization rotators, multiplexers, and/or other passive or active optical elements in various embodiments. In some embodiments, multiple light signals may be multiplexed or otherwise coupled with the optical communication channel 130.

One or more on-chip optical isolators 108 may be optically coupled with the on-chip light sources 104 and may suppress reflections back to the light sources 104. In some embodiments, the isolator 108 may include a MO layer over and in direct contact with a waveguide and a closed loop resonator, with more details shown in FIGS. 2A-2C.

In some embodiments, the isolator 108 may also include a heater, e.g., a micro-heater 105 over the waveguide or along a side of the waveguide. In some embodiments, the PIC 103 may also include a feedback control loop 109 and a photodetector 107 connected to the closed loop resonator 108 and the micro-heater 105.

As shown in more details in FIGS. 1B-1C, the photodetector 107 may be a sensor of light or other electromagnetic energy. The photodetector 107 may convert light signals that hit the photodetector 107 into voltage, current, and/or power. The feedback control loop 109 may control the operation of the closed loop resonator within the isolator 108 based on the detected current, voltage, or power by the photodetector 107. The feedback control loop 109 may monitor forward transmission of the light 111 and increase such forward transmission of the light, while keeping the heater 105 to operate around the turning point 110. In embodiments, the heater 105 and the feedback control loop 109 may enable a wide bandwidth operation for the closed loop resonator.

Figure 2A:
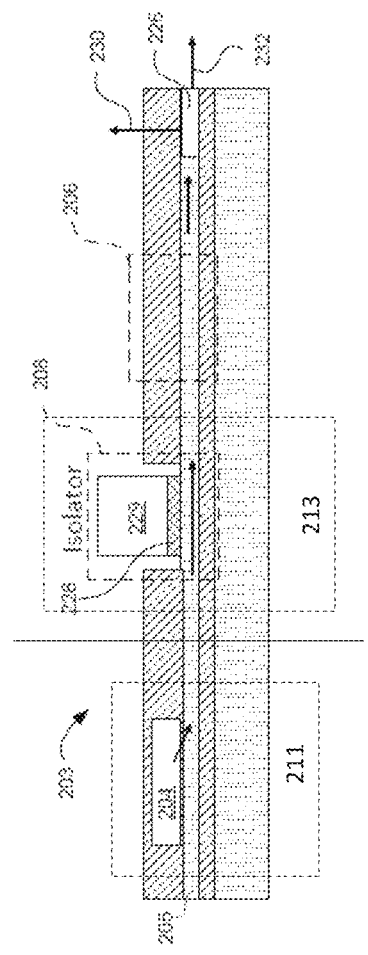
Figure 2B:
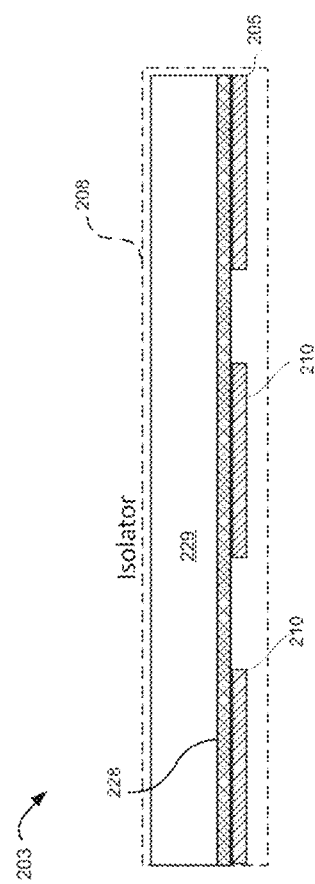

FIGS. 2A-2C schematically illustrate cross-sectional side views of a PIC 203 having an on-chip optical isolator 208 and a top view of the on-chip optical isolator 208, according to various embodiments.

FIG. 2A schematically illustrates a cross-sectional side view along one direction of a PIC 203 having an on-chip optical isolator 208. In some embodiments, the PIC 203 may have a laser 204 that may direct light to a waveguide 205. In various embodiments, the PIC 203 may be an implementation of the PIC 103 described with respect to FIG. 1. Photonic devices 206, details not shown for clarity, may be included on the PIC 203 in various embodiments. An on-chip optical isolator 208 may suppress reflections of light passing through the waveguide 205 back to a light source, e.g., the laser 204. The laser 204 may be located in a first section 211, while the optical isolator 208 may be located in a second section 213, disjoint from the first section 211. The photonic devices 206 may include photonic components such as modulators, splitters, couplers, filters, detectors, phase shifters, polarization rotators, multiplexers, and/or other passive or active optical elements in various embodiments. An optical coupler 226 may couple light from the PIC 203 to provide off-chip light transmission. In some embodiments, the optical coupler 226 may couple the light in a first direction 230 orthogonal to a plane of the PIC 203 or in a second direction 232.

In various embodiments, the optical isolator 208 may include a MO layer 228 and a lattice matched substrate 229. In various embodiments, one or more components of the PIC 203 may be implemented on a photonics chip such as a silicon or SOI chip. In various embodiments, the PIC 203 may include a silicon waveguide and/or other components formed of SOI, an optical nitride such as silicon nitride or aluminum nitride, indium phosphide or other type III-V materials, gallium nitride, tantalum oxide, or germanium for example.

FIG. 2B schematically illustrates a cross-sectional side view along another direction perpendicular to the direction of FIG. 2A, of the PIC 203 having an on-chip optical isolator 208, as shown in FIG. 2A. In some embodiments, the PIC 203 may have the waveguide 205, which may be coupled with the laser, not shown in FIG. 2B. In addition, a closed loop resonator 210 may be coupled to the laser through the waveguide 205. The MO layer 228 may be over and in direct contact with the waveguide 205 and the closed loop resonator 210. Furthermore, a lattice matched substrate 229 may be adjacent to the MO layer 228.

FIG. 2C schematically illustrates more details of a top view of the on-chip optical isolator 208 shown in FIGS. 2A-2B, according to various embodiments. In some embodiments, the on-chip optical isolator 208 may be similar to the optical isolator 108 described with respect to FIG. 1.

In embodiments, the optical isolator 208 may include a waveguide 205 and a closed loop resonator 210, which may lay at a same plane as the waveguide 205. The closed loop resonator 210 may include a first polarization rotator (PR) 214, and a second PR, 216. A light from the laser in transverse electric (TE) mode through the waveguide 205 may be rotated in the first PR 214 to a light in transverse magnetic (TM) mode, and the light in TM mode may be rotated in the second PR 216 back to the light in TE mode. At the section 202 between the first PR 214 and the second PR 216, the light may be in TM mode.

The optical isolator 208 may further include one or more heaters, e.g., micro-heaters 212 placed over the waveguide 205 or along a side of the waveguide 205. The micro-heater 212 may be separated from the closed loop resonator 210 by a cladding material, not shown in FIG. 2C. The cladding layer may include silicon dioxide, silicon oxynitride, silicon nitride, or some other material, and may be in 1 mm thick. The closed loop resonator 210 and the micro-heater 212 may be connected to a feedback control loop 109, as shown in FIG. 1.

In embodiments, the closed loop resonator may be a ring shape resonator, a racetrack shape resonator, and/or some other type of resonator. In embodiments, the PR 214 or the PR 216 may be a PR with off-axis double cores, a PR with cascaded bends, a PR with bi-level tapers, a PR with stacked waveguides, a PR with slanted cores, a PR with cores having a cut corner, and/or some other type of PR.

In embodiments, the waveguide 205 may be a slab waveguide, a rib waveguide, a rectangular core waveguide, a straight waveguide, and/or some other type of waveguide. The waveguide may have a width in a range of about 0.1 μm to about 2 μm.

In embodiments, the optical isolator 208 may include the MO layer 228, which may be over and in direct contact with the waveguide 205 and the closed loop resonator 210. The closed loop resonator 210 may be completely under the MO layer 228. The MO layer 228 may include a material selected from a rare-earth garnet family such as a rare-earth iron garnet material, a rare-earth gallium garnet material, a rare-earth aluminum garnet material, or some other rare-earth garnet material. In operation, a magnetic field 218 may be applied in one perpendicular direction to the light in TM mode within the section 202 between the first PR 214 and the second PR 216. In some embodiments, the first PR 214 and the second PR 216 may rotate light to be in a TM mode while it is under the MO layer 228 and back to a TE mode when it is no longer under the MO layer 228.

In embodiments, the closed loop resonator 210 may have a first width at the section 202 having the light in TM mode, a second width for the section having the light in TE mode, and the first width may be larger than the second width.

In various embodiments, a magnetic field 218 may saturate the MO layer 228 and may be applied externally with an external source (not shown) such as a permanent magnet or inductive coil, or the MO layer 228 may have an intrinsic magnetization. The optical isolator 208 may use non-reciprocal phase shift (NRPS) generated by the MO layer 228. In embodiments, light propagating in forward and backward directions may experience opposite phase shifts, enabling constructive interference in the forward direction and destructive interference in the backward direction, thereby preventing light from propagating back into a light source, e.g., laser.

Figure 3:
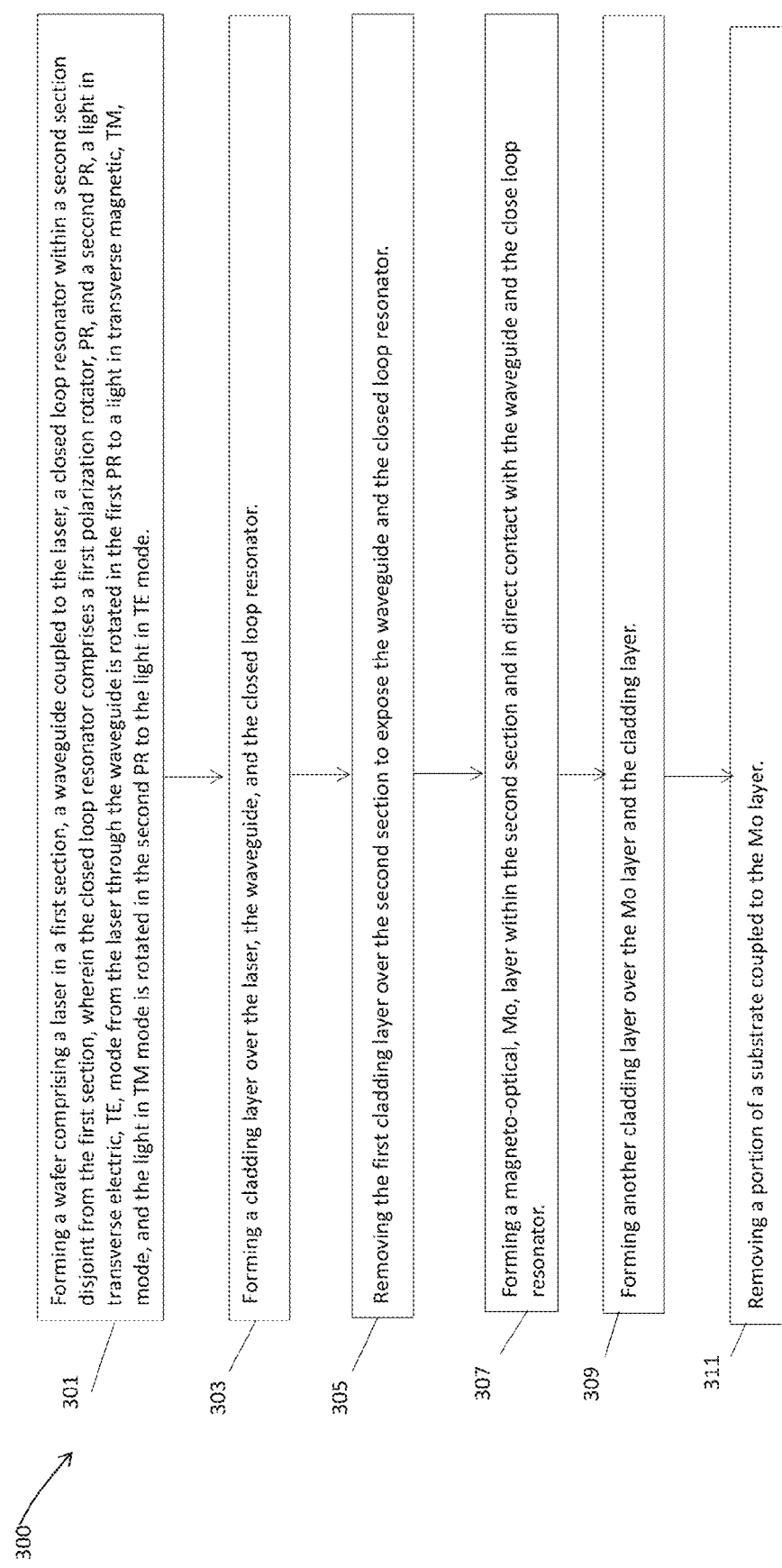
FIG. 3 schematically illustrates a flow diagram of a process for fabricating a photonic integrated circuit including an on-chip optical isolator, according to various embodiments.

FIG. 3 schematically illustrates a flow diagram of a process 300 for fabricating a PIC including an on-chip optical isolator, according to various embodiments. In embodiments, the process 300 may be practiced to fabricate a PIC such as the PIC 103 described with respect to FIG. 1, the PIC 203 described with respect to FIG. 2A, the on-chip optical isolator 208 described with respect to FIGS. 2A-2C, the PIC 403 described with respect to FIGS. 4A-4D. In embodiments, the PIC may be formed on a SOI wafer with a silicon substrate, an insulating layer, and a silicon layer such as the layers below layer 405 shown in FIGS. 4A-4D.

FIGS. 4A to 4D schematically illustrate a cross-sectional side view of a PIC 403 having an on-chip optical isolator 408 at various stages of formation, according to some embodiments. More specifically, the PIC 403 may be similar the PIC 103 described with respect to FIG. 1 or the PIC 203 described with respect to FIG. 2A. In some embodiments, the isolator 408 may be similar to the isolator 108, or the isolator 208 described with respect to FIGS. 1-2. FIGS. 4A to 4D are described more fully in the description relating to FIG. 3.

At a block 301, the process 300 may include forming a wafer comprising a laser in a first section, a waveguide coupled to the laser, a closed loop resonator within a second section disjoint from the first section. For example, the process 300 may form the laser 404 in section 411, and the waveguide 405 as shown in FIGS. 4A-4D, and a closed loop resonator, such as the closed loop resonator 210 shown in FIGS. 2B-2C, not shown in FIGS. 4A-4D. In embodiments, the closed loop resonator may lay at a same plane as the waveguide. In embodiments, the closed loop resonator, such as the closed loop resonator 210 as shown in FIG. 2C, may include a first polarization rotator (PR), and a second PR, a light in transverse electric (TE) mode from the laser through the waveguide is rotated in the first PR to a light in transverse magnetic (TM) mode, and the light in TM mode is rotated in the second PR to the light in TE mode.

In some embodiments, the laser formed may be a hybrid laser such as the light source 104 described with respect to FIG. 1, the laser 204 described with respect to FIG. 2A, or the laser 404 described with respect to FIGS. 4A-4D. In various embodiments, a photonic wafer that may be a silicon photonic wafer, a SOI wafer, or another wafer type may be partially or fully fabricated at the block 301, including waveguides, lasers, modulators, multiplexers, and/or other optical components.

At a block 303, the process 300 may include forming a cladding layer over the laser, the waveguide, and the closed loop resonator. In some embodiments, at the block 303, an oxide cladding, such as the oxide cladding 406 shown in FIGS. 4A-4D may be deposited over the waveguide 405 and/or the laser 404 formed at the block 301.

Figure 4A:
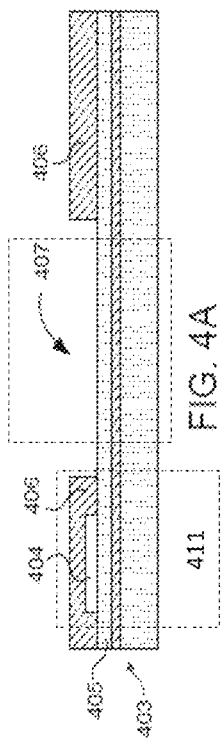
FIGS. 4A to 4D schematically illustrate a cross-sectional side view of a photonic integrated circuit having an on-chip optical isolator at various stages of formation, according to some embodiments.

At a block 305, the process 300 may include removing a portion of the oxide cladding formed at the block 303, over the second section to expose the waveguide and the closed loop resonator. In embodiments, the oxide cladding may be removed in an isolator region, exposing the silicon. In some embodiments, the oxide cladding removed may correspond to a portion of the original oxide cladding layer 406 shown in FIGS. 4A-4D. The oxide cladding may be removed from above a second section 407 of the waveguide 405 as shown in FIG. 4A in various embodiments. In some embodiments, the oxide cladding may be removed with a dry etch process, a wet etch process, or other technique.

Figure 4B:
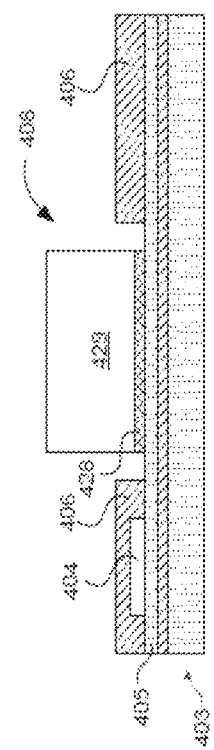
Figure 4C:
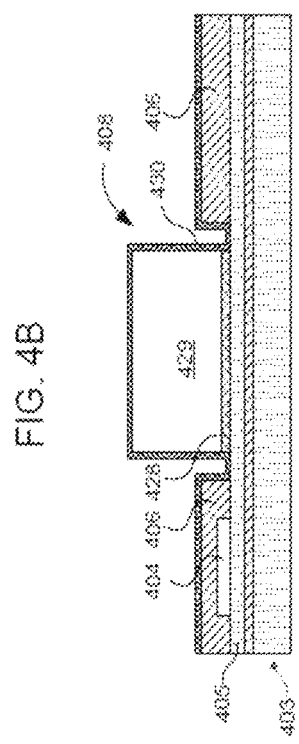
Figure 4D:
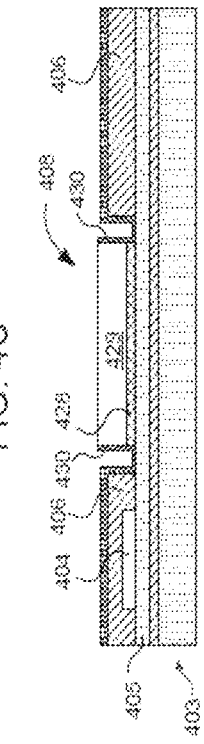

At a block 307, the process 300 may include forming a MO layer to the waveguide in the process of forming an optical isolator such as an optical isolator 408 shown in FIGS. 4B-4D. In various embodiments, the MO layer may form part of an optical isolator such as the optical isolator 108, 208, or 408. In some embodiments, the MO layer may correspond to 228, and/or 428. Before bonding to the PIC, the MO layer may be on a die that includes a lattice matched substrate in various embodiments. The substrate may correspond to the substrate 429 shown in FIGS. 4B-4D in some embodiments. In various embodiments, the die may be flip bonded face down to waveguide 405 such that the MO layer is in direct contact with the waveguides in the isolator region. In some embodiments, the die may be bonded using plasma activation (hydrophilic) bonding, high-vacuum (room temperature hydrophobic) bonding, adhesive bonding, solder or eutectic metal bonding with the metal outside the waveguide region, or some other bonding technique.

In various embodiments, the MO layer may be formed of a material from a rare-earth garnet family and may have a high Faraday rotation and low optical loss to produce a relatively high NRPS over a relatively short length. In some embodiments, the MO layer may include a rare-earth iron garnet (RIG) material (e.g., $R_3Fe_5O_{12}$), a rare-earth gallium garnet (RGG) material (e.g., $R_3Ga_5O_{12}$), a rare-earth aluminum garnet (RAG) material (e.g., $R_3Al_5O_{12}$), or some other type of rare-earth garnet material. In various embodiments, the MO layer may include a wide variety of elements such as Bismuth (Bi), Lutetium (Lu), Holmium (Ho), Gadolinium (Gd), Yttrium (Y), or others selected based at least in part on Faraday rotation, magnetization, and/or other physical properties. In some embodiments, the MO layer may be grown as a single crystal on a lattice-matched substrate using liquid phase epitaxy (LPE), although other growth or deposition processes may be used. In various embodiments, a bismuth iron garnet (BIG) based material grown by LPE on a gadolinium gallium garnet (GGG) substrate, or a variant that may include elements such as Lu, Gd, Ga, Ho, Al, or others may be used. In some embodiments, the substrate may also have additional elements such as Europium (Eu) to more closely match a lattice constant of a desired MO film. In some embodiments, the waveguide may be a silicon waveguide and the MO garnet film may be bonded directly to a silicon surface of the waveguide such as by using a plasma-activated or other bonding process between the MO garnet film and the silicon.

At a block 309, the process 300 may include forming another cladding layer over the MO layer and the cladding layer. In various embodiments, another cladding may be a cladding such as cladding 430 shown in FIGS. 4C-4D. The cladding may be formed of a material such as silicon dioxide, silicon nitride, an oxynitride, or other cladding material in various embodiments. In some embodiments, the cladding may reduce reflections that may otherwise occur at an interface of one or more edges of the MO layer and the waveguide by reducing an index of refraction difference where the waveguide passed into and out of the garnet-clad region, thus reducing reflections and optical loss.

At a block 311, the process 300 may include removing at least a portion of substrate 429 coupled with the MO layer. In various embodiments, the portion of the substrate may be removed with a technique such as grinding, polishing, wet/dry etching, or some other technique. In some embodiments, a portion of the cladding may also be removed. In various embodiments, the substrate may have a thickness of approximately 500 microns before the removal process and may have a thickness greater than or equal to 5 microns and less than or equal to 50 microns after the removal process. In some embodiments, the substrate may have a thickness of approximately 30 microns after the removal process. Following removal of substrate material, the PIC may appear similar to the PIC 403 shown in FIG. 4D where a height of the garnet die of isolator 408 is shown to be reduced in comparison to its height in FIG. 4C. In various embodiments, the cladding material deposited at the block 309, while removed from the top of the die, may still be present at the edges of the MO layer 428 and/or between the die and the oxide cladding 406 such that the waveguide 405 is covered by the cladding 430 in this region rather than being exposed to air. In some embodiments, the cladding layer deposited at the block 309 may be deposited after rather than before removal of substrate at the block 311.

Figure 5:
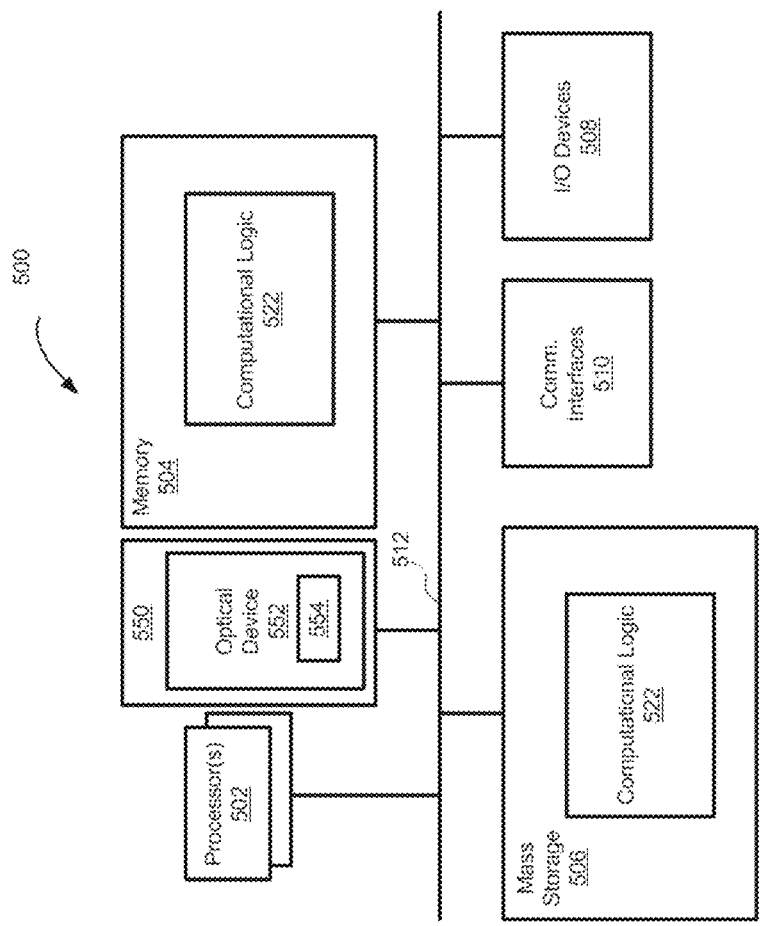
FIG. 5 schematically illustrates an example computing device and an optical device with an on-chip optical isolator, according to various embodiments.

FIG. 5 schematically illustrates an example computing device and an optical device with an on-chip optical isolator, according to various embodiments.

FIG. 5 illustrates an example computing device 500 suitable for use with various components and processes of FIGS. 1-4, such as optoelectronic system 100 including optical device 102 with PIC 103 and optical isolator 108 described with respect to FIG. 1, PIC 203 and optical isolator 208 described with respect to FIG. 2, the PIC and optical isolator formed in accordance with the process 300 described with respect to FIG. 3, and PIC 403 and optical isolator 408 described with respect to FIG. 4, in accordance with various embodiments.

As shown, computing device 500 may include one or more processors or processor cores 502 and system memory 504. For the purpose of this application, including the claims, the terms "processor" and "processor cores" may be considered synonymous, unless the context clearly requires otherwise. The processor 502 may include any type of processors, such as a central processing unit (CPU), a microprocessor, and the like. The processor 502 may be implemented as an integrated circuit having multi-cores, e.g., a multi-core microprocessor. The computing device 500 may include mass storage devices 506 (such as diskette, hard drive, volatile memory (e.g., dynamic random-access memory (DRAM), compact disc read-only memory (CD-ROM), digital versatile disk (DVD), and so forth). In general, system memory 504 and/or mass storage devices 506 may be temporal and/or persistent storage of any type, including, but not limited to, volatile and non-volatile memory, optical, magnetic, and/or solid state mass storage, and so forth. Volatile memory may include, but is not limited to, static and/or dynamic random access memory. Non-volatile memory may include, but is not limited to, electrically erasable programmable read-only memory, phase change memory, resistive memory, and so forth.

The computing device 500 may further include input/output devices 508 (such as a display (e.g., a touchscreen display), keyboard, cursor control, remote control, gaming controller, image capture device, and so forth) and communication interfaces 510 (such as network interface cards, modems, infrared receivers, radio receivers (e.g., Bluetooth), and so forth). The computing device 500 may include an optoelectronic system 550 that may include an optical device 552 with a PIC 554 having an on-chip optical isolator. In various embodiments, the optoelectronic system 550 may be similar to the optoelectronic system 100, the optical device 552 may be similar to the optical apparatus 102 and/or the PIC 554 may be similar to the PIC 103, PIC 203, or PIC 403 and/or may include an on-chip optical isolator similar to the optical isolator 108, 208, and/or 408.

The communication interfaces 510 may include communication chips (not shown) that may operate the device 500 in accordance with a Global System for Mobile Communication (GSM), General Packet Radio Service (GPRS), Universal Mobile Telecommunications System (UMTS), High Speed Packet Access (HSPA), Evolved HSPA (E-HSPA), or Long-Term Evolution (LTE) network. The communication chips may also operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chips may operate in accordance with Code Division Multiple Access (CDMA), Time Division Multiple Access (TDMA), Digital Enhanced Cordless Telecommunications (DECT), Evolution-Data Optimized (EV-DO), derivatives thereof, as well as any other wireless protocols that are designated as 3G, 4G, 5G, and beyond. The communication interfaces 510 may operate in accordance with other wireless protocols in other embodiments.

The above-described computing device 500 elements may be coupled to each other via system bus 512, which may represent one or more buses. In the case of multiple buses, they may be bridged by one or more bus bridges (not shown). Each of these elements may perform its conventional functions known in the art. In particular, system memory 504 and mass storage devices 506 may be employed to store a working copy and a permanent copy of the programming instructions, such as drivers, for the operation of various components of computer system 500, including but not limited to the operation of the optical device 102 of FIG. 1, the PIC 203 of FIG. 2, the PIC 403 or FIG. 4, an operating system of computer system 500, and/or one or more applications, collectively referred to as computational logic 522. The various elements may be implemented by assembler instructions supported by processor(s) 502 or high-level languages that may be compiled into such instructions.

The permanent copy of the programming instructions may be placed into mass storage devices 506 in the factory or in the field through, for example, a distribution medium (not shown), such as a compact disc (CD), or through communication interface 510 (from a distribution server (not shown)). That is, one or more distribution media having an implementation of the agent program may be employed to distribute the agent and to program various computing devices.

The number, capability, and/or capacity of the elements 508, 510, 512 may vary, depending on whether computing device 500 is used as a stationary computing device, such as a set-top box or desktop computer, or a mobile computing device, such as a tablet computing device, laptop computer, game console, or smartphone. Their constitutions are otherwise known, and accordingly will not be further described.

For some embodiments, at least one of processors 502 may be packaged together with all or portions of computational logic 522 to facilitate aspects of embodiments described herein to form a System in Package (SiP) or a System on Chip (SoC).

The computing device 500 may include or otherwise be associated with an optoelectronic system that may include components and/or implement processes described with respect to FIGS. 1-4, such as optoelectronic system 100, implementing aspects of the optical device 102, including the PIC 103, 203, or 403 or optical isolator 108, 208, or 408 as described above, and in particular the embodiments of the optical isolator described in reference to FIGS. 1-4. In some embodiments, at least some components of the optoelectronic system 100 (e.g., optical device 102) may be communicatively coupled with the computing device 500 and/or be included in one or more of the computing device 500 components, such as communication interfaces 510, for example. In some embodiments, one or more components such as processor 502 may be included as a part of the optoelectronics system 100.

In various implementations, the computing device 500 may include one or more components of a data center, a laptop, a netbook, a notebook, an ultrabook, a smartphone, a tablet, a personal digital assistant (PDA), an ultra mobile PC, a mobile phone, or a digital camera. In further implementations, the computing device 500 may be any other electronic device that processes data.

EXAMPLES

Example 1 may include a photonic integrated circuit, comprising: a laser within a first section; a waveguide coupled with the laser; a closed loop resonator within a second section disjoint from the first section, coupled to the laser through the waveguide, wherein the closed loop resonator comprises a first polarization rotator (PR), and a second PR, and wherein a light from the laser in transverse electric (TE) mode through the waveguide is rotated in the first PR of the closed loop resonator to a light in transverse magnetic (TM) mode, and the light in TM mode is rotated in the second PR of the closed loop resonator back to the light in TE mode; and a magneto-optical (MO) layer in the second section, further over and in direct contact with the waveguide and the closed loop resonator.

Example 2 may include the photonic integrated circuit of example 1 and/or some other examples herein, wherein the closed loop resonator is completely under the MO layer, and wherein a magnetic field is perpendicular to the light in TM mode between the first PR and the second PR in one direction.

Example 3 may include the photonic integrated circuit of example 1 and/or some other examples herein, wherein the first PR is a PR with off-axis double cores, a PR with cascaded bends, a PR with bi-level tapers, a PR with stacked waveguides, a PR with slanted cores, or a PR with cores having a cut corner.

Example 4 may include the photonic integrated circuit of example 1 and/or some other examples herein, wherein the closed loop resonator is a ring shape resonator or a racetrack shape resonator.

Example 5 may include the photonic integrated circuit of example 1 and/or some other examples herein, wherein the MO layer comprises a material selected from a rare-earth garnet family consisting of a rare-earth iron garnet material, a rare-earth gallium garnet material, and a rare-earth aluminum garnet material.

Example 6 may include the photonic integrated circuit of example 1 and/or some other examples herein, wherein the waveguide is a slab waveguide, a rib waveguide, a rectangular core waveguide, or a straight waveguide.

Example 7 may include the photonic integrated circuit of example 1 and/or some other examples herein, wherein the waveguide has a width in a range of about 0.1 µm to about 2 µm.

Example 8 may include the photonic integrated circuit of any of examples 1-7 and/or some other examples herein, wherein the waveguide has a first width at a first part having the light in TM mode, a second width at a second part having the light in TE mode, and the first width is larger than the second width.

Example 9 may include the photonic integrated circuit of any of examples 1-7 and/or some other examples herein, further comprises a first cladding layer over the laser.

Example 10 may include the photonic integrated circuit of example 9 and/or some other examples herein, further comprises a second cladding layer over the first cladding layer.

Example 11 may include the photonic integrated circuit of example 9 and/or some other examples herein, wherein the first cladding layer comprises silicon dioxide, silicon oxynitride, or silicon nitride.

Example 12 may include the photonic integrated circuit of example 9 and/or some other examples herein, wherein the first cladding layer is about 1 mm thick.

Example 13 may include the photonic integrated circuit of any of examples 1-7 and/or some other examples herein, further comprising a micro-heater placed over the waveguide or along a side of the waveguide and separated from the closed loop resonator by a cladding material.

Example 14 may include the photonic integrated circuit of example 13 and/or some other examples herein, further comprising an output power based feedback control loop connected to the micro-heater controlling the closed loop resonator.

Example 15 may include a method of fabricating a photonic integrated circuit, comprising: forming a wafer that includes a laser in a first section, a waveguide coupled to the laser, a closed loop resonator coupled to the laser through the waveguide within a second section disjoint from the first section, wherein the closed loop resonator comprises a first polarization rotator (PR), and a second PR, and wherein a light from the laser in transverse electric (TE) mode through the waveguide is rotated in the first PR to a light in transverse magnetic (TM) mode, and the light in TM mode is rotated in the second PR back to the light in TE mode; forming a first cladding layer over the laser, the waveguide, and the closed loop resonator; removing the first cladding layer in the second section to expose the waveguide and the closed loop resonator; and forming a magneto-optical (MO) layer within the second section over and in direct contact with the waveguide and the closed loop resonator.

Example 16 may include the method of example 15 and/or some other examples herein, further comprising: forming a second cladding layer over the first cladding layer, and the MO layer.

Example 17 may include the method of example 16 and/or some other examples herein, further comprising: forming a micro-heater placed over the waveguide or along a side of the waveguide and separated from the closed loop resonator by the first cladding layer.

Example 18 may include the method of example 17 and/or some other examples herein, further comprising: forming an output power based feedback control loop connected to the micro-heater controlling the closed loop resonator.

Example 19 may include the method of any of examples 15-18 and/or some other examples herein, wherein the closed loop resonator is completely under the MO layer, the light from the laser enters the MO layer in TE mode, is rotated to the light in TM mode by the first PR, the light in TM mode is further rotated back to the light in TE mode by the second PR, and the light in TE mode leaves the MO layer, and wherein a magnetic field is perpendicular to the light in TM mode in one direction.

Example 20 may include the method of any of examples 15-18 and/or some other examples herein, wherein the closed loop resonator is a ring shape resonator or a racetrack shape resonator.

Example 21 may include the method of any of examples 15-18 and/or some other examples herein, wherein the MO layer comprises a material selected from a rare-earth garnet family consisting of a rare-earth iron garnet material, a rare-earth gallium garnet material, and a rare-earth aluminum garnet material.

Example 22 may include the method of any of examples 15-18 and/or some other examples herein, wherein the waveguide is a slab waveguide, a rib waveguide, a rectangular core waveguide, or a straight waveguide.

Example 23 may include an interconnect, comprising: a photonic integrated circuit having: a wafer that includes a laser within a first section, a waveguide coupled to the laser, and a cladding layer over the laser; a closed loop resonator within a second section disjoint from the first section, coupled to the laser through the waveguide, wherein the closed loop resonator comprises a first polarization rotator (PR), and a second PR, a light in transverse electric (TE) mode from the laser through the waveguide is rotated in the first PR to a light in transverse magnetic (TM) mode, and the light in TM mode is rotated in the second PR back to the light in TE mode; a magneto-optical (MO) layer over and in direct contact with the waveguide and the closed loop resonator; a micro-heater over the waveguide or along a side of the waveguide and separated from the closed loop resonator by the cladding layer; and an output power based feedback control loop connected to the micro-heater controlling the closed loop resonator.

Example 24 may include the interconnect of example 23 and/or some other examples herein, wherein the closed loop resonator is completely under the MO layer, the light from the laser enters the MO layer in TE mode, is rotated to the light in TM mode by the first PR, the light in TM mode is further rotated back to the light in TE mode by the second PR, and the light in TE mode leaves the MO layer, and wherein a magnetic field is perpendicular to the light in TM mode in one direction.

Example 25 may include the interconnect of any of examples 23-24 and/or some other examples herein, wherein the cladding layer comprises silicon dioxide, silicon oxynitride, or silicon nitride.

Example 26 may include the interconnect of any of examples 23-24 and/or some other examples herein, wherein the closed loop resonator is a ring shape resonator or a racetrack shape resonator.

Example 27 may include the interconnect of any of examples 23-24 and/or some other examples herein, wherein the MO layer comprises a material selected from a rare-earth garnet family consisting of a rare-earth iron garnet material, a rare-earth gallium garnet material, and a rare-earth aluminum garnet material.

Example 28 may include the interconnect of any of examples 23-24 and/or some other examples herein, wherein the waveguide is a slab waveguide, a rib waveguide, a rectangular core waveguide, or a straight waveguide.

These modifications may be made to the disclosure in light of the above detailed description. The terms used in the following claims should not be construed to limit the disclosure to the specific implementation disclosed in the specification and the claims. Rather, the scope of the disclosure is to be determined entirely by the following claims, which are to be construed in accordance with established doctrines of claim interpretation.

What is claimed is:

1. A photonic integrated circuit, comprising:
   a laser within a first section;
   a waveguide coupled with the laser;
   a closed loop resonator within a second section disjoint from the first section, coupled to the laser through the waveguide, wherein the closed loop resonator comprises a first polarization rotator (PR), and a second PR, and wherein a light from the laser in transverse electric (TE) mode through the waveguide is rotated in the first PR of the closed loop resonator to a light in transverse magnetic (TM) mode, and the light in the TM mode is rotated in the second PR of the closed loop resonator back to the light in the TE mode; and
   a magneto-optical (MO) layer in the second section, further over and in direct contact with the waveguide and the closed loop resonator.

2. The photonic integrated circuit of claim 1, wherein the closed loop resonator is completely under the MO layer, and wherein a magnetic field is perpendicular to the light in the TM mode between the first PR and the second PR in one direction.

3. The photonic integrated circuit of claim 1, wherein the first PR is a PR with off-axis double cores, a PR with cascaded bends, a PR with bi-level tapers, a PR with stacked waveguides, a PR with slanted cores, or a PR with cores having a cut corner.

4. The photonic integrated circuit of claim 1, wherein the MO layer comprises a material selected from a rare-earth garnet family consisting of a rare-earth iron garnet material, a rare-earth gallium garnet material, and a rare-earth aluminum garnet material.

5. The photonic integrated circuit of claim 1, wherein the waveguide is a slab waveguide, a rib waveguide, a rectangular core waveguide, or a straight waveguide.

6. The photonic integrated circuit of claim 1, wherein the waveguide has a first width at a first part having the light in the TM mode, a second width at a second part having the light in the TE mode, and the first width is larger than the second width.

7. The photonic integrated circuit of claim 1, further comprising a first cladding layer over the laser.

8. The photonic integrated circuit of claim 1, further comprising a micro-heater placed over the waveguide or along a side of the waveguide and separated from the closed loop resonator by a cladding material.

9. The photonic integrated circuit of claim 8, further comprising an output power based feedback control loop connected to the micro-heater controlling the closed loop resonator.

* * * * *